United States Patent
Parla et al.

(10) Patent No.: US 8,533,780 B2
(45) Date of Patent: Sep. 10, 2013

(54) DYNAMIC CONTENT-BASED ROUTING

(75) Inventors: Vincent E. Parla, North Hampton, NH (US); Philip John Steuart Gladstone, Carlisle, MA (US); David J. McCowan, Scituate, MA (US); Andrew Zawadowskiy, Hollis, NH (US); Christopher A. Fitzgerald, Boulder, CO (US)

(73) Assignee: Cisco Technology, Inc., San Jose, CA (US)

( * ) Notice: Subject to any disclaimer, the term of this patent is extended or adjusted under 35 U.S.C. 154(b) by 614 days.

(21) Appl. No.: 12/644,412

(22) Filed: Dec. 22, 2009

(65) Prior Publication Data

US 2011/0154477 A1   Jun. 23, 2011

(51) Int. Cl.
*H04L 29/06* (2006.01)

(52) U.S. Cl.
USPC .............................................. 726/3; 713/153

(58) Field of Classification Search
USPC ............ 726/3, 13, 11, 15; 713/153; 709/238
See application file for complete search history.

(56) References Cited

U.S. PATENT DOCUMENTS

| | | | | |
|---|---|---|---|---|
| 5,842,040 | A * | 11/1998 | Hughes et al. | 710/11 |
| 7,315,541 | B1 * | 1/2008 | Housel et al. | 370/392 |
| 7,353,533 | B2 * | 4/2008 | Wright et al. | 726/1 |
| 7,395,341 | B2 * | 7/2008 | Nicodemus et al. | 709/229 |
| 7,836,489 | B2 * | 11/2010 | Kaler et al. | 726/3 |
| 8,116,811 | B2 * | 2/2012 | Kobayashi et al. | 455/552.1 |
| 2006/0072573 | A1 | 4/2006 | Broberg et al. | |
| 2008/0034409 | A1 | 2/2008 | O'Rourke et al. | |
| 2008/0195733 | A1 | 8/2008 | Detienne et al. | |

* cited by examiner

*Primary Examiner* — Ali Abyaneh
(74) *Attorney, Agent, or Firm* — Edell, Shapiro & Finnan, LLC

(57) ABSTRACT

Systems and methods for redirecting network traffic include a policy server configured to be in communication with a policy database and a client disposed on a remote device. The policy server is configured to receive an inquiry from the client regarding a universal resource locator (URL) request and, based on a policy obtained from the policy database, cause the client to control the remote device such that network traffic associated with the URL request is routed (tunneled) via a particular interface, e.g., a virtual private network (VPN) connection, when so required by the policy, and network traffic associated with the URL request is routed over a different VPN connection or a non-VPN connection when so required by the policy.

20 Claims, 5 Drawing Sheets

POLICY DATABASE

| | |
|---|---|
| www.aaa.com/bbb | tunnel |
| www.aaa.com/ccc | offload |
| www.company.com/private | tunnel |
| www.company.com/documents | block |
| www.company.com/home | offload |

*FIG. 2*

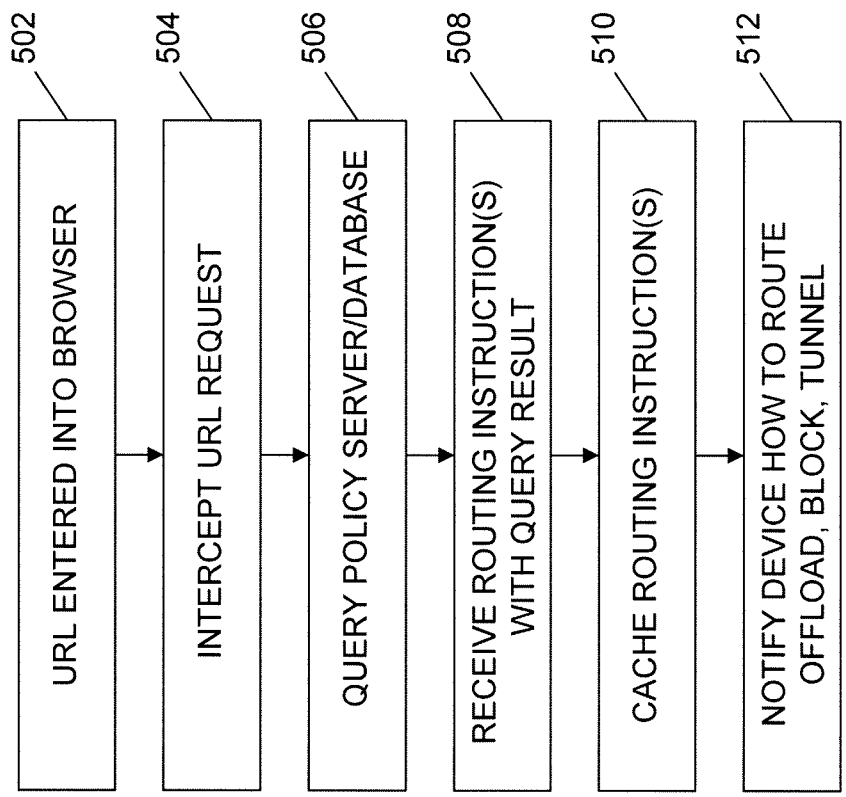

DYNAMIC CONTENT-BASED ROUTING

TECHNICAL FIELD

The present disclosure relates to network traffic routing on an endpoint device (e.g., personal computer, mobile telephone, etc.) and particularly to redirecting network traffic to and from a specific interface, such as a virtual private network (VPN), based on content or network participation mechanisms.

BACKGROUND

As one example of an "interface," a virtual private network (VPN) is a computer network that is implemented in an additional software layer (overlay) on top of an existing larger network for the purpose of creating a private scope of computer communications or providing a secure extension of a private network into an insecure network such as the Internet. The links between nodes of a virtual private network are formed over logical connections or virtual circuits between hosts of the larger network. The Network Layer protocols of the virtual network are said to be "tunneled" through the underlying transport network.

One common application of a VPN is to secure communications through the public Internet, but a VPN does not necessarily need to have explicit security features such as authentication or traffic encryption. For example, VPNs can be used to separate the traffic of different users or user communities over an underlying network.

While the use of VPNs is quite popular, other interfaces are also available to users including, but not limited to, Local Area Networks (LANs) or cellular telecommunications channels. Some of these interfaces operate independently of each other or in combination with one another. For example, a VPN could be established over a cellular channel.

BRIEF DESCRIPTION OF THE DRAWINGS

FIG. 2 shows example entries in a policy server database.

FIG. 5 is an example flow chart that depicts a series of steps for performing dynamic content-based routing.

DESCRIPTION OF EXAMPLE EMBODIMENTS

Overview

Figure 1:
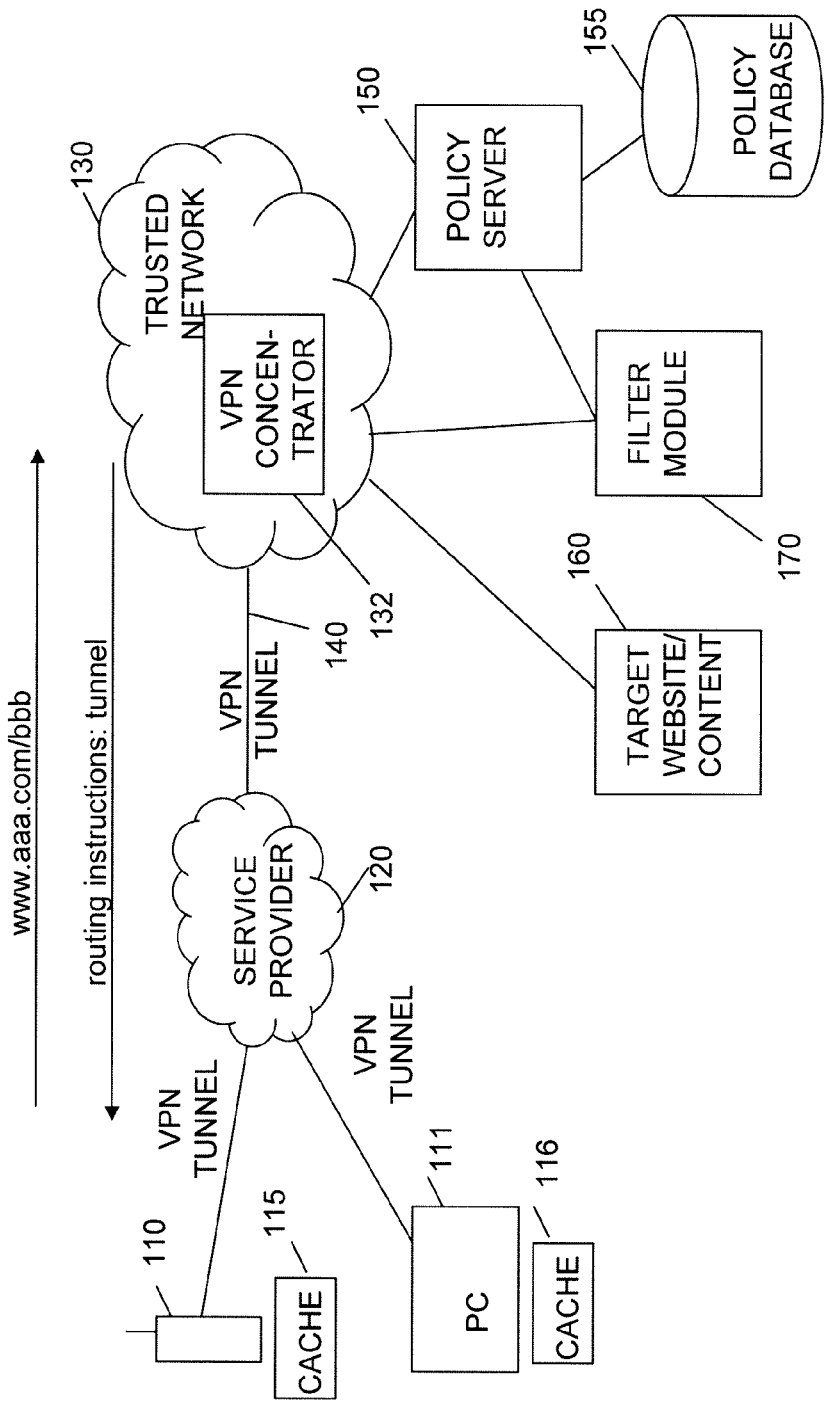
FIG. 1 shows an example of a network topology and associated components for implementing dynamic content-based routing where routing is conducted via a virtual private network.

Systems and methods are provided that enable increased control over how network traffic is tunneled via a particular interface, such as a virtual private network connection. Traditional routing techniques rely on the use of Internet Protocol IPv6 or IPv4 addressing to direct traffic towards a particular interface. The methodology described herein allows multiple data paths, over disparate interfaces, to exist for the same network address space, or segment of that space and does not rely on traditional IP address routing techniques.

Description

The term "interface" is used herein to describe any mechanism on the endpoint device that allows network connectivity. This can include, but is not limited to, LAN or Wireless adapters, Cellular cards, VPN adapters, Proxies, Tunnel pseudo-interfaces, among others.

The system includes a policy server configured to be in communication with a policy database and a client disposed on a remote device, such as a mobile telephone or computer. The policy server is configured to receive an inquiry from the client regarding a universal resource locator (URL) request (entered via, e.g., a browser) and, based on a policy obtained from the policy database, cause the client to control the remote device such that network traffic associated with the URL request is routed over (i.e., tunneled via), e.g., a VPN connection when so required by the policy, and network traffic associated with the URL request is routed over a non-VPN connection or interface, or a different VPN connection, when so required/permitted by the policy.

The methodology provides increased control over network traffic routing by inspecting each URL request, rather than only a top level domain name or IP address. Furthermore, where a given webpage is generated by a browser using content collected from multiple URLs, some aspects of that webpage may be tunneled via the VPN whereas other aspects of the webpage may be received directly from the host (i.e., without being tunneled).

The policy server may be disposed within a trusted corporate infrastructure and may leverage existing World Wide Web analysis tools and filtering tools such as Ironport™ Web Security Appliance, available from Cisco Technologies, Inc. (San Jose, Calif.). More details follow below.

One of the strongest ways to secure a remote device or endpoint of a network is by establishing an "always-on" virtual private network (VPN) tunnel back to an enterprise or corporate infrastructure and to tunnel all network traffic, e.g., all Internet Protocol (IP) traffic, via the VPN tunnel. This allows the network to protect the asset (i.e., the remote device) as well as the information, data, intellectual property, etc. that might leave the asset over the network. Such an always-on VPN tunnel may sometimes be referred to as "Secure Virtual Perimeter." This is a "virtual perimeter" in the sense that the network can be thought of as borderless since any remote device can be securely connected back to the enterprise, where the VPN is in an always-on state.

However, always-on VPN has the drawback of consuming corporate network bandwidth because all of the traffic is tunneled back to/via the corporate/enterprise infrastructure. This is, in many cases, unnecessary or undesirable.

"Fixed split tunneling" is another configuration that is sometimes employed to control the manner in which network traffic is routed. Fixed split tunneling is based on Internet Protocol (IP) addresses or Domain Name Server (DNS) domain namespaces and, consequently, lacks the ability to secure the asset against issues that might reside at a portion of a network. For example, the website for youtube.com has both reputable and disreputable content. Allowing all direct access (i.e., not via VPN tunneling) to YouTube's network can be considered insecure. As a result, most corporate networks/enterprise do not configure for fixed split tunneling.

Embodiments described herein are different from the aforementioned always-on (i.e., always use) VPN routing or "fixed split tunneling," and are referred to as "dynamic content-based routing." Dynamic content-based routing, as will be explained in more specific detail below, enables dynamic redirection of network traffic to and from a remote endpoint device, whereby VPN tunneling resources or other resources, and thus corporate infrastructure, are used more sparingly. In one embodiment, the remote endpoint device is caused to redirect traffic based on content inspection or network participation mechanisms.

FIG. 1 shows a network topology and associated components for implementing dynamic content-based routing where, in an embodiment, routing is dynamically directed to a virtual private network. A remote device such as mobile telephone 110 or wired or wireless computer 111 is in communication with a service provider network 120. Such a service provider 120 could be a mobile telephone network that provides Internet access, a cable television provider that provides Internet service, or a telephone company that also provides Internet access via, e.g., a digital subscriber line (DSL) or fiber optic connectivity.

A trusted network 130 is provided by, typically, an entity different from the service provider, although there may be circumstances where the service provider 120 has physical control of the trusted network 130, but the latter is logically controlled by a different entity, such as a large enterprise (e.g., a company, university, government agency, etc.). A virtual private network (VPN) "tunnel" 140 is established between the remote device 110, 111 and the trusted network 130. As noted before, A VPN is a computer network that is implemented in an additional software layer (overlay) on top of an existing larger network for the purpose of creating a private scope of computer communications or providing a secure extension of a private network into an insecure network such as the Internet. The links between nodes of a virtual private network are formed over logical connections or virtual circuits between hosts of the larger network, thus enabling the borderless characteristic of the network.

Thus, in the case of FIG. 1, the VPN tunnel 140 is established between a network endpoint, such as the remote device 110, 111 and, in this case, a VPN concentrator 132 of trusted network 130 that is configured to service multiple VPN connections simultaneously. The use of the VPN tunnel will be explained in more detail later herein.

A policy server 150 is in communication with the trusted network 130, which is shown outside of the trusted network 130. However, the policy server 150 can also be part of the trusted network 130 or corporate infrastructure, which in most instances may be more desirable. The policy server 150 communicates with a policy database 155, the contents of which is depicted in FIG. 2. As shown in FIG. 2, the policy database includes a listing of URLs (not only top level domain names or IP addresses) along with an indication of how the content of that URL should be routed to and from the remote device 110, 111. Specifically, in the implementation shown in FIG. 2, the indication indicates "tunnel" or "offload" for each given URL. "Block" is also a possible option, as indicated, and such an indication would preclude the remote endpoint device from receiving any data from the target or requested web site or page. It should be noted that while FIG. 2 shows full URLs, it is also possible that policy database lists partial URLs or even patterns that match URLs.

Referring again to FIG. 1 the methodology of dynamic content-based routing is explained. When a user (not shown) enters a URL into, e.g., a browser to access the webpage associated with that URL, the URL is intercepted by the remote device (using a client operating on the remote device). In this case, the request is "GET http://www.aaa.com/bbb." The URL is passed to the trusted network by the remote device client and, in turn, is passed to the policy server 150/ policy database 155 to determine how network traffic associated with the URL request is to be routed. In the case of content associated with www.aaa.com/bbb, the indication in policy database 155 (FIG. 2) is "tunnel." That indication is then sent back to the client, which is configured to cause the operating system on the remote device to route the network traffic accordingly and, in this case, via VPN 140. Routing could also have been indicated to flow via another interface such a cellular or LAN interface.

The policy database 155 could be configured as a "white list" where network traffic associated with selected top level domain names is permitted to be offloaded (from the enterprise infrastructure), whereas traffic for any other URL would be forced or directed (or redirected) to the VPN tunnel 140.

As mentioned, it is noted that although the discussion herein is focused primarily on redirecting network traffic to a VPN tunnel, these redirection techniques can also be used to redirect traffic toward or via other interfaces. For example, if there is an opportunity to exchange data over the network via an IEEE 802.11 type interface such as Wireless Fidelity (WiFi), then traffic could be so-redirected. Similarly, where a wired connection is available, traffic could be redirected via that interface. LAN, other wireless, cellular and proxy interfaces may also be employed for redirected routing.

FIG. 1 also shows that remote endpoint devices 110, 111 can also include cache memory 115, 116, which can be used to store the policy database indications, such that the remote endpoint device need not necessarily make a request back to the policy server 150 each and every time a URL request is posted in a browser. The system may also be configured to date stamp the indications so that they do not get "stale" and therefore, possibly, inaccurate. Thus, the system may first check whether an indication is available in cache for a selected URL, and if the indication is not older than a predetermined threshold, the cached indication may be relied upon to make the routing decision. In the event cache is relied upon, the trusted network 130 will not see the offloaded traffic. In one possible implementation, however, the end point device 110, 111 tracks (all) offloaded activity and reports this information to the trusted network 130 on a periodic basis.

Figure 3:
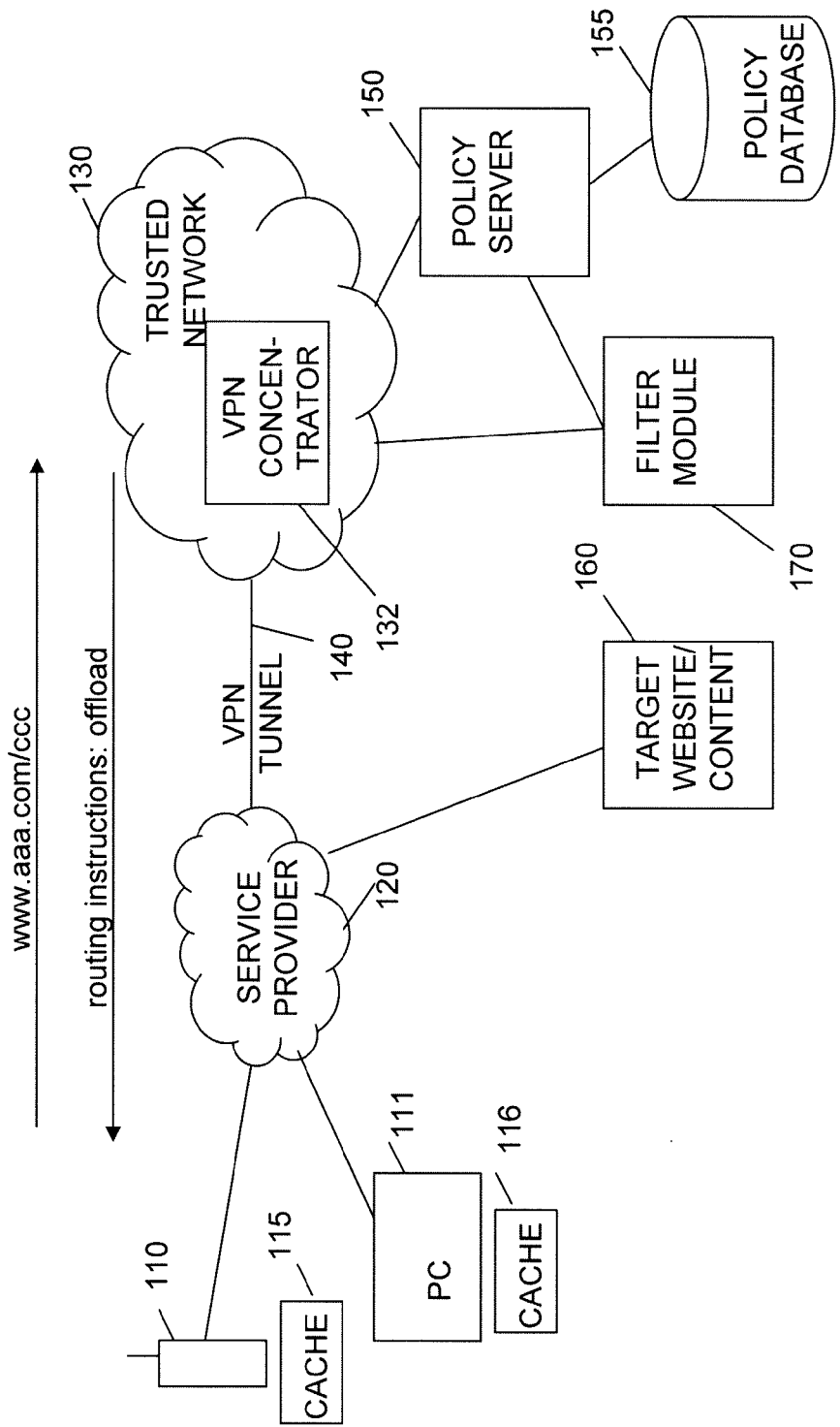
FIG. 3 shows an example of the same network topology as FIG. 1, but where routing is conducted via a different or non-virtual private network path.

Since, for the case of FIG. 1, the target website/content 160 www.aaa.com/bbb is to be routed via the VPN 140, this means, as shown, that the network traffic is passed via the trusted network 130 such that corporate infrastructure is being used. On the other hand, and as shown in FIG. 3, for the URL www.aaa.com/ccc, the routing indication received from the policy server at the remote endpoint device is "offload," meaning that the network traffic need not be routed via the VPN 140. Accordingly, the client operating on the remote device causes the operating system on the remote device to receive/route the network traffic associated with URL www.aaa.com/ccc directly from the web server 160 that hosts the requested URL. This effectively removes the corporate infrastructure from the exchange of data, thereby alleviating that infrastructure from having to use precious, perhaps expensive, bandwidth.

Filter module 170 shown in FIG. 1 may be provided by a third party, or operated by the trusted network 130. Filter module 170 may be used to receive a URL request from the trusted network 130 and determine how the content of that URL should be classified, namely as content that should be directed via a particular tunnel or interface 140 or offloaded from the corporate infrastructure. That is, when the policy database does not have an entry for a given URL, the URL may be passed to the filter module 170 for classification. In a preferred embodiment, a system administrator would have the ability to override any result provided by the filter module 170. Likewise, a system administrator would preferably have the ability to enable or disable the VPN tunnel 140 entirely, or to configure the system to operate as an always-on system or a fixed split tunneling system.

Figure 4:
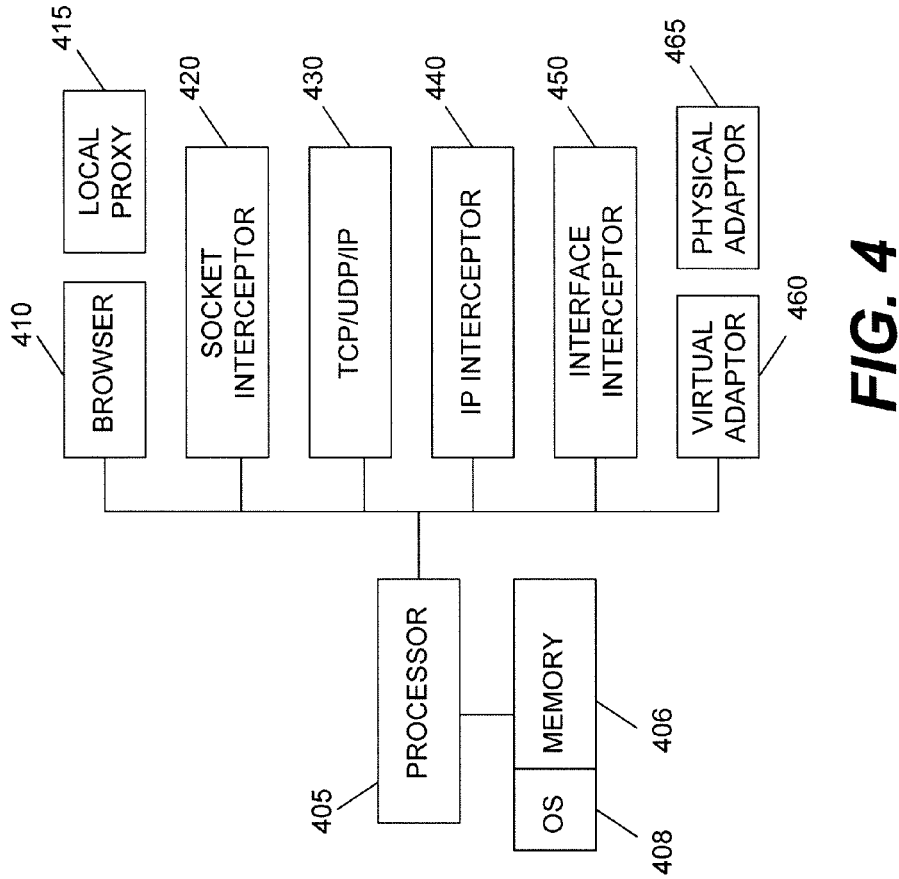
FIG. 4 depicts an example client-side arrangement for intercepting and redirecting network traffic.

FIG. 4 depicts client-side hardware and related components for intercepting and redirecting network traffic. A processor 405, such as a microprocessor, application specific integrated circuit (ASIC) or the like, is in communication with memory 406 in which is stored processor instructions (i.e., computer readable instructions) for performing the functionality described herein. Memory 406 may also include an operating system (OS) 408. The processor 405 may be a microprocessor, microcontroller, system on a chip (SOC), or other fixed or programmable logic that secures the appropriate information. In addition, the processor 405 may be implemented by a processor readable tangible medium encoded with instructions or by logic encoded in one or more tangible media (e.g., embedded logic such as an application specific integrated circuit (ASIC), digital signal processor (DSP) instructions, software that is executed by a processor, field programmable gate array (FPGA), etc.), wherein the memory 406 stores data used for the computations or functions described herein (and/or to store software or processor instructions that are executed to carry out the computations or functions described herein). Thus, functions of dynamic content-based routing may be implemented with fixed logic or programmable logic (e.g., software or computer instructions executed by a processor.

The memory 406 may be any form of random access memory (RAM) or other data storage block that stores data used for the techniques described herein. The memory 406 may be separate from or part of the processor 405. Instructions for performing the redirection methodology described herein may be stored in the memory 406 for execution by the processor 405.

The processor 405 is in communication directly or indirectly with browser 410, local proxy 415, socket interceptor 420, TCP/UDP/IP routing module 430, IP interceptor 440, interface interceptor 450, virtual adaptor 460 and physical adaptor 465.

The browser 410 is a conventional browser application. The socket interceptor 420 intercepts connection requests from an application (e.g., browser 410) before they are passed to TCP/UDP/IP stack 430. If connection is of interest (according to some configured policy) it will redirect them to local proxy 415. Local proxy 415 can be a user or kernel mode component.

IP interceptor 440 intercepts IP packets after TCP/UDP/IP module 430 and executes routing instructions provided by local proxy 415 on how to route given packets. If needed, this component may perform NAT functions. As a result of a routing decision, IP interceptor 440 sends packets to the proper interface, e.g., Virtual Adaptor 460 or Physical Adaptor 465, or other adapters under its management.

On some platforms, IP interceptor 440 can not execute a final send on particular interface, and in such cases interface interceptor 450 may be employed.

Virtual Adaptor 460 is a driver, which presents to the OS 408 a view of virtual adaptor 460 with all the characteristics of physical network adaptor 465 such that the OS 408 will properly initialize it as real adapter. As a result, from the point of view of OS 408, this adaptor is a real network adapter to which data can be sent and from which can be received. In reality, virtual adaptor 460 uses services of real physical adaptor 465 to perform send and receive network operations.

When a user application (e.g., browser 410) initiates network connection to a desired destination of interest (e.g., a selected web server etc.), socket interceptor 420 intercepts the connection request before it is passed to TCP/UDP/IP stack 430 and redirects connection to local proxy 415, by substituting the target destination with local destination address. As such, when TCP/UDP/IP module 430 receives the connection request it will have a new, replaced, value for the target IP address, which is the address of the local proxy component 415. Local proxy component 415 terminates the connection locally by accepting the connection request from originating application. This, in turn, indicates to local originating application (browser 410) that the connection to desired destination is established. This allows the application (browser) to proceed to communication by performing a GET or other command, in the case of the HTTP protocol. Of course, HTTP is used here only as example and similar logical steps are taken for other protocols.

Since connection was established with local proxy 415, local proxy 415 will begin receiving requested data from the user application. Based on the context of the request, local proxy 415 decides how to route the real connection request to the real intended destination. The decision can be performed by consulting local cache for cached decision or consulting remote policy server 150 in the network 130. When a decision is made, local proxy 415 indicates to IP and Interface interceptors 440, 450 how to route the coming next connection request and all its packets from the local proxy 415 to the particular intended destination. Thereafter, local proxy 415 originates the actual request. When the connection packets show up via the IP interceptor 440 and/or interface interceptor 450 they will consult their dynamic routing tables (populated by request from local proxy or other means) and depending on instructions from the local proxy 415 will send packets to virtual adaptor 460 or to physical adaptor 465. Packets sent to virtual adaptor 460, will/can be processed by an appropriate VPN component and properly encrypted before transmission.

FIG. 5 is a flow chart that depicts a series of steps for performing dynamic content-based routing. At step 502, a URL is entered into a browser (or other application that accepts such input) of a remote endpoint device, such as a mobile phone, among other possible endpoint devices. At step 504, the URL request is intercepted by a client process or system operating on the remote endpoint device. A policy server/database is then queried at step 506 to obtain routing instructions in connection with routing traffic associated with the URL in the URL request. At step 508, the routing instruction(s) is/are received at the client process or system on the remote endpoint device. Where desired, either as a default, or by express instructions from the policy sever/database, the routing instruction(s), as indicated by step 510, is/are cached on the remote endpoint device such that future URL requests to the same URL need not be passed to the policy server/database, at least for some predetermined amount of time after original caching. As indicated, a plurality of routing instructions may be supplied by the policy server/database and received by the remote endpoint device. All such routing instructions may similarly be cached. Finally, at step 512, the client process or system notifies, directs or causes the remote endpoint device (e.g., via its operating system) to offload the network traffic associated with the URL request, to block the network traffic (in the event the policy requires such blocking), or to tunnel the network traffic via corporate infrastructure (e.g., VPN) or other interface, thus maintaining increased control and potential security over the data.

Thus, dynamic content-based routing provides the ability to dynamically direct traffic to or from a VPN tunnel or other interface based on network participation mechanisms and/or content inspection, where content inspection includes inspection of an application being used (e.g., a voice or video application). In the case of a VPN tunnel interface, a VPN endpoint can leverage information stored by network devices such as the Ironport™ web security appliance by requesting the reputation of a particular URL and then, based on VPN policy, adaptively redirect the specific URL request (or, more generally, "use" request) to or away from the VPN tunnel, or to or away from a different VPN tunnel possibly from among a plurality of available VPN tunnels.

By leveraging the intelligence of the network, the VPN endpoint can provide the same level of security of full tunneling while having the added benefit of offloading "trusted" traffic to the Internet directly.

Other mechanisms for achieving redirection can include protocol inspection. For example, policy could be configured to allow local area network (LAN) printing. In this case, determining that the traffic is targeted for a local LAN (e.g., same subnet as the remote device is connected to) and that the content is a print request would result in allowing the traffic to be directed to the local subnet instead of sending it over the VPN tunnel.

Both network participation and content inspection can be layered to provide an additional level of protection. For example, it is possible to allow direct access to a particular URL, but remove potentially malicious content based on policy (e.g., removing a binary download, for example, from a site with a trusted reputation score).

Embodiments described herein thus allow continued protection afforded by always-on VPN full tunneling, while offloading traffic from the corporate network based on the network indicating that the traffic is safe to send directly. As a result of using the policy server, the system is not constrained by preconfigured, fixed lists such as network addresses or DNS domain namespaces that traditional split tunneling configurations use.

The dynamic content-based routing described herein preserves network bandwidth for critical enterprise application such as Voice over IP (VoIP) or internal video. It further leverages the fact that most browsing activity and bandwidth intensive application are HTTP (HTTP-GET) requests, not HTTPS. That is, most browser requests are basic GET requests and many of such requests are not in need of VPN connectivity. Thus, as a result of dynamic content-based routing, the endpoint experience of, e.g., a mobile user is much improved compared to an always-on VPN configuration. Likewise, the impact on enterprise infrastructure/bandwidth can be reduced.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A system, comprising:
a policy server configured to be in communication with a policy database; and
a client disposed on a remote device,
the policy server configured to:
receive an inquiry from the client regarding a use request,
receive a policy configured to control the use request obtained from the policy database, and
cause the client to control the remote device to route network traffic associated with the use request via an indicated interface when so required by the policy, and route network traffic associated with the use request over another interface when so required by the policy;
wherein the policy server causes the client to control the remote device to select between the indicated interface and the another interface according to the content of the use request.

2. The system of claim 1, wherein the indicated interface is a first virtual private network (VPN) connection.

3. The system of claim 2, wherein the another interface is selected from the group consisting of a second VPN connection different from the first VPN connection, a local area network interface, a wireless communications interface, a cellular telecommunications interface and a proxy interface.

4. The system of claim 1, wherein the content of the use request comprises a universal resource locator (URL) request, and wherein the policy database contains URLs and corresponding policies.

5. The system of claim 4, wherein the client is configured to intercept the URL request and send the URL request as part of the inquiry to the policy server.

6. The system of claim 1, wherein the use request is for an application.

7. The system of claim 1, wherein the remote device is a mobile device which initiates the use request.

8. The system of claim 1, wherein the client is configured to access cached policies on the remote device which initiates the use request.

9. The system of claim 1, wherein the system is in communication with a content filter service.

10. The system of claim 9, wherein the policy server is in communication with the content filter service.

11. The system of claim 9, wherein the policy database is updated based on information received from the filter service.

12. A method, comprising:
receiving an inquiry regarding a universal resource locator (URL) request;
querying a policy database having stored therein a plurality of URLs, where each URL has a respective routing preference;
obtaining a routing preference from the policy database for the URL request, and
controlling a remote device to tunnel network traffic over a virtual private network (VPN) connection when so required by the routing preference obtained from the policy database, and controlling the remote device to route network traffic associated with the browser URL request via a non-VPN connection when so required by the routing preference obtained from the policy database;
wherein the routing preference causes the remote device to select between the VPN connection and the non-VPN connection according to the content of the URL request.

13. The method of claim 12, further comprising receiving the inquiry from a mobile device which initiates the URL request.

14. The method of claim 12, further comprising caching the routing preference on the remote device.

15. The method of claim 12, further comprising blocking network traffic associated with the browser URL request.

16. The method of claim 12, further comprising inspecting protocol elements to determine the routing preference.

17. The method of claim 16, further comprising causing the remote device to route the network traffic via the VPN based on a value of one or more selected protocol elements.

18. A non-transitory processor readable medium encoded with instructions that, when executed by a processor, cause the processor to:
  intercept a universal resource locator (URL) request to obtain an intercepted URL request;
  query, using the intercepted URL request, a policy database having stored therein a plurality of URLs, where each URL has a respective routing preference;
  obtain a routing preference from the policy database for the URL request, and
  control a remote device integrated with the processor to tunnel network traffic to and from the remote device over a first virtual private network (VPN) connection or route network traffic associated with the URL request via a second VPN connection different from the first VPN connection or via a non-VPN connection when so required by the routing preference obtained from the policy database;
  wherein the remote device initiates the URL request, and
  wherein the routing preference causes the remote device to select between the first VPN connection and at least one of the second VPN connection or the non-VPN connection according to the content of the URL request.

19. The processor readable medium of claim 18, further encoded with instructions that, when executed by a processor, cause the processor to:
  cache the response from the query.

20. The processor readable medium of claim 18, further encoded with instructions that, when executed by a processor, cause the processor to:
  cause the remote device to block network traffic associated with the URL request.

* * * * *